United States Patent [19]
Ninomiya

[11] Patent Number: 5,809,330
[45] Date of Patent: Sep. 15, 1998

[54] CONFLICT FREE PC IN WHICH ONLY THE I/O ADDRESS OF INTERNAL DEVICE IS CHANGE WHEN IT IS DETERMINED THAT THE I/O ADDRESS IS OVERLAP BY EXPANSION DEVICE

[75] Inventor: Ryoji Ninomiya, Aoume, Japan

[73] Assignee: Kabushiki Kaisha Toshiba, Tokyo, Japan

[21] Appl. No.: 720,273

[22] Filed: Sep. 26, 1996

Related U.S. Application Data

[63] Continuation of Ser. No. 299,202, Aug. 31, 1994, abandoned.

[30] Foreign Application Priority Data

Mar. 28, 1994 [JP] Japan .................................. 6-057414

[51] Int. Cl.$^6$ .................................................. G06F 13/00
[52] U.S. Cl. .................... 395/829; 395/653; 395/185.06; 395/824; 395/866
[58] Field of Search .................................. 395/281, 290, 395/653, 868, 185.06, 824, 829, 866

[56] References Cited

U.S. PATENT DOCUMENTS

| | | |
|---|---|---|
| 4,149,238 | 4/1979 | James et al. ............................. 395/290 |
| 4,736,290 | 4/1988 | McCallion ............................... 395/412 |
| 4,860,252 | 8/1989 | Sykora ..................................... 395/405 |
| 4,875,158 | 10/1989 | Ashkin et al. .......................... 395/868 |
| 5,187,792 | 2/1993 | Dayan et al. ............................ 395/700 |
| 5,293,593 | 3/1994 | Hodge et al. ............................ 395/412 |
| 5,377,357 | 12/1994 | Nishigaki et al. ...................... 395/281 |
| 5,386,515 | 1/1995 | Martin et al. .......................... 395/825 |
| 5,386,567 | 1/1995 | Lien et al. ............................... 395/653 |
| 5,390,308 | 2/1995 | Ware et al. ............................. 395/405 |
| 5,596,728 | 1/1997 | Belmont .................................. 395/281 |

*Primary Examiner*—Thomas C. Lee
*Assistant Examiner*—Po C. Huang
*Attorney, Agent, or Firm*—Loeb & Loeb LLP

[57] ABSTRACT

Among devices on the system board, all devices other than those devices essential to the operation of the system such as system timer 19 and real-time clock 20, i.e., I/O devices 24 and 25, are constructed such that their environment may be configured and changed. If the hardware resources allocated to I/O devices 24 and 25, such as I/O address areas, interrupt levels, etc., overlap with the hardware resources requested by option cards 32 or 33, the hardware resources allocated to I/O devices 24 and 25 are automatically changed. As a result, the internal I/O devices and option boards can always be made to operate normally, regardless of the values set for the I/O address areas, etc., for option cards 32 and 33.

22 Claims, 12 Drawing Sheets

BIOS SETUP INFORMATION

| ENVIRONMENT CONFIGURABLE DEVICE | I/O ADDRESS | IRQ | EN/DIS |
|---|---|---|---|
| SERIAL PORT 1 | 3F8H ~ 3FFH | IRQ4 | EN/DIS |
| SERIAL PORT 2 | 2F8H ~ 2FFH | IRQ3 | EN/DIS |
| PRINTER PORT 1 | 378H ~ 37FH | IRQ7 | EN/DIS |
| FLOPPY DISK INTERFACE | 3F0H ~ 3F7H | IRQ6 | EN/DIS |
| ⋮ | ⋮ | ⋮ | ⋮ |

FIG. 2

| INTERRUPT LEVEL | DEVICE |
|---|---|
| IRQ 0 | SYSTEM TIMER |
| IRQ 1 | KEYBOARD CONTROLLER |
| IRQ 2 | PIC #2 |
| IRQ 3 | SERIAL PORT 2 (I/O DEVICE 1) |
| IRQ 4 | SERIAL PORT 1 |
| IRQ 5 | |
| IRQ 6 | FLOPPY DISK CONTROLLER |
| IRQ 7 | PRINTER PORT 1 (I/O DEVICE 2) |
| IRQ 8 | REAL-TIME CLOCK |
| IRQ 9 | |
| IRQ 10 | |
| IRQ 11 | SCSI CONTROLLER |
| IRQ 12 | |
| IRQ 13 | |
| IRQ 14 | HARD DISK CONTROLLER |
| IRQ 15 | |

OPTION CARD 1 → (IRQ 3)

CHANGE INTERRUPT LEVEL FOR I/O DEVICE 1

FIG. 7

CONFLICT FREE PC IN WHICH ONLY THE I/O ADDRESS OF INTERNAL DEVICE IS CHANGE WHEN IT IS DETERMINED THAT THE I/O ADDRESS IS OVERLAP BY EXPANSION DEVICE

This is a continuation of application Ser. No. 08/299,202, filed on Aug. 31, 1994, now abandoned.

BACKGROUND THE INVENTION

1. Field of the Invention

This invention pertains to a computer system, and particularly to a computer system having an expansion connector that can be connected to an expansion device such as an option card.

2. Description of Related Art

In recent years, various types of easy-to-carry, battery-operable portable computers such as laptop and notebook computers have been developed. Some of these types of computers include expansion connectors to allow the connection of expansion devices such as option cards when necessary. Among such option cards, so-called ISA cards using ISA architecture are well known as an industry standard.

For each option card of this type, certain hardware resources (I/O address area, interrupt level, etc.) necessary for use of the card are prescribed. In addition, most option cards have jumpers or dip switches operable by the user, and are constructed such that the I/O address area or interrupt level may be changed by changing the settings of the jumpers or dip switches. If, using the jumpers and dip switches, the values for the option card's I/O address area and interrupt level are set to values not being used by other I/O devices, the option card may be used normally.

However, in order to correctly set the jumpers or dip switches, it must be determined whether the I/O address area is already in use by I/O devices such as various types of peripheral LSI controllers built into the portable computer, or by a different option card already connected to an expansion connector. This operation is extremely difficult for a user.

If the option card's I/O address area is mistakenly set using the jumpers or dip switches to an I/O address area that overlaps with an I/O address area already in use either by an internal I/O device in the portable computer or by a different option card, the portable computer will malfunction.

In other words, if I/O access is performed while the option card and a different I/O device share the same I/O address area, data bus contention will occur, in which the read data from the two devices sharing the same I/O address area will collide in the data bus. As a result, the read data is destroyed and normal I/O access cannot be carried out. In this case, not only will the option card not function normally, but in some cases the computer system may hang, and the operating system may not be able to boot properly even if the power is cycled off and on.

In addition, where the interrupt level for an option card is the same as that for a different I/O device, the CPU will not be able to determine from which device an interrupt request was sent, and the option card will not function normally.

A conventional computer system suffers from the drawback that it is necessary for the user to correctly set the I/O address area, etc. for an expansion device such as an option card by manipulating jumpers or dip switches, and if by mistake the option card and an internal I/O device in the portable computer are set to overlapping I/O address areas, the computer system will have difficulty operating, and in some cases the computer system will hang, and the operating system will not be able to boot properly.

It is therefore an object of the present invention to secure operation of the entire system, including option cards, regardless of the values set for the I/O address areas of said option cards.

SUMMARY OF THE INVENTION

This invention was designed with this point in mind, and is intended to provide a computer system in which even if the user sets the option card's I/O address area to a value overlapping with the I/O address of an internal I/O device in the portable computer, the proper operation of the entire system, including the option card, may be secured, and in which normal operation of the computer system is possible regardless of the set value of the I/O address area for the option card.

The computer system of this invention comprises a CPU; a system bus that is electrically connected to the CPU; an internal I/O device connected to the system bus and constructed such that the allocated I/O address area may be changed; an expansion connector electrically connected to said system bus; an expansion device detachably connected to said expansion connector that receives and decodes the I/O address received from the system bus via said expansion connector and operates when said I/O address falls within the prescribed I/O address area requested by said expansion device; and an environment configuration means that configures the operating environment for said internal I/O device in response to the supply of power to the system. The environment configuration means comprises a means that outputs to said system bus the I/O address falling under the first I/O address area allocated beforehand to said internal I/O device and performs access to said internal I/O device via said system bus; a means that determines, based on whether or not access to said internal I/O device was carried out normally, whether or not said first I/O address area allocated to said internal I/O device overlaps with the I/O address area requested by said expansion device; and a means that, if it is determined that said I/O address areas do overlap, changes the I/O address area for said internal I/O device to a second I/O address area different from said first I/O address area.

In this computer system, when the power is turned on, the environment configuration operation for the internal I/O device is carried out. In this environment configuration operation, first, the first I/O address area is allocated to the internal I/O device. The value of this first address area is, for example, reserved beforehand as the default I/O address area for the internal device. Then, the internal I/O device is accessed using the I/O address falling under this first I/O address area.

If the I/O address area requested by an expansion device such as an option card connected to the expansion connector is the same as the first I/O address area, the request for access to the internal I/O device is also received by the expansion device. Consequently, a state of contention occurs for access to the internal I/O device and access to the expansion device, as a result of which the internal I/O device cannot be accessed normally. On the other hand, if the I/O address area requested by the expansion device is different from the first I/O address area, the internal I/O device may be accessed normally. Therefore, by determining whether or not the internal I/O device was accessed normally, it may be determined whether the internal I/O device address area overlaps with the expansion device address area.

If it is determined that the I/O address areas overlap, the address area assigned to the internal I/O device is automatically changed to a second I/O address area different from the first I/O address area. In this way, the I/O address area for the expansion device may be prevented from overlapping with the I/O address area for the internal I/O device no matter what value to which the I/O address area requested by the expansion device is set.

In determining whether or not the internal I/O device was accessed normally, it is desirable to perform read access to read the status data from the internal I/O device status register. If the I/O address areas for the internal I/O device and the expansion device overlap, data bus contention will occur when read access is carried out. On the other hand, if the I/O address areas do not overlap, the desired status data value may be read from the internal I/O device. In addition, by performing so-called write-read comparison, in which write data is compared with read data read from the storage location for the write data, it may be determined whether the internal I/O device was accessed normally. If this is done, both write access and read access may be checked, and it may be thus conclusively determined whether the I/O address areas overlap.

Moreover, in the computer system of this invention, in order to deal with the situation in which the system hangs when the internal I/O device is accessed, it is determined when the power is turned on again by the user whether this was done after a hanging of the system due to overlapping I/O addresses, and if it was, the I/O address area of the internal I/O device is automatically changed from the first I/O address area to a second I/O address area. Therefore, in the situation where the system hangs due to an I/O address overlap, normal operation is guaranteed only if the power is turned on again and the system restarted.

Furthermore, in the computer system of this invention, the assigned I/O address change of the internal I/O device is carried out by hardware including a programmable first register and an address decoder.

In the first register, the value for the first I/O address area assigned to the internal I/O device is set. The address decoder decodes the I/O address from the CPU, and if that I/O address falls within the address area designated by the value set in the first register, the internal I/O device is enabled. As a result, by only changing the value set in the first register, the internal I/O device can be easily assigned to a freely-chosen I/O address area.

In addition, the computer system of this invention is characterized by the fact that if it is determined that an I/O address area overlap exists, not only is the internal I/O device's I/O address area changed, but the interrupt level is changed as well. This interrupt level change may be carried out by an interrupt controller, a programmable second register, and a means that, when an interrupt request signal is received from the internal I/O device, supplies an interrupt request signal corresponding to the interrupt level set in the second register to the interrupt input element of the interrupt controller.

Moreover, the computer system of the present invention comprises a CPU; a system bus electrically connected to the CPU; multiple internal I/O devices connected to the system bus and constructed such that their respective assigned address areas may be changed; an expansion connector electrically connected to said system bus; an expansion device detachably connected to said expansion connector that receives and decodes the I/O address received from the system bus via said expansion connector and operates when the I/O address falls within a prescribed I/O address area requested by said expansion device; an address management table that houses address information indicating an address area stored beforehand for each internal I/O device such that the I/O address areas allocated to each of said multiple internal I/O devices differ from one another; an environment configuration means that determines whether or not the I/O address area for each of said multiple internal I/O devices overlaps with the I/O address area requested by said expansion device and sets the operating environment for said multiple internal I/O devices in accordance with such determination, wherein said environment configuration means comprises a means that sets a flag in a non-volatile memory device indicating that the environment configuration process for one or more of said multiple internal I/O devices is underway, a means that selects each of said multiple internal I/O devices in sequence for environment configuration and sets in said non-volatile memory device the device ID indicating the internal I/O device selected for environment configuration, a means that outputs to said system bus the I/O address falling within the I/O address area for the internal I/O device designated for environment configuration by said address information and accesses by means of the system bus said internal I/O device designated for environment configuration, a means that determines, based on whether or not access of said internal I/O device designated for environment configuration was performed normally, whether or not said I/O address area assigned to said internal I/O device overlaps with the I/O address area requested by said expansion device, a means that, if it is determined that such an overlap exists, changes the address area for said internal I/O device designated for environment configuration by renewing said address information, and a means that resets said flag in response to the completion of the determination of the existence or non-existence of an overlapping I/O address area for each of said multiple internal I/O devices; a means that determines whether or not said flag is set by reference to said non-volatile memory device when the system power is turned on; a means that, in response to a determination that said flag is set, renews said address information for the internal I/O device designated by the device ID stored in said non-volatile memory device and changes the I/O address area assigned to the internal I/O device designated by said device ID; and a means that, in response to a determination that said flag was reset, has said environment configuration means carry out said environment configuration operation.

In this computer system, there are multiple internal I/O devices with variable I/O addresses, and the environment configuration operation is carried out in sequence for these internal I/O devices in response to the turning on of power to the system. In this case, for example prior to the beginning of the environment configuration operation, a flag indicating that the environment configuration operation is taking place is set in a non-volatile memory device such as a backed-up memory. In the environment configuration operation, in order to check for the existence or non-existence of an overlap between the I/O address area for an internal I/O device designated for environment configuration and the expansion device, the internal I/O device designated for environment configuration is accessed. If this access is performed normally, the I/O address area for the internal I/O device designated for environment configuration is not changed and the default value is maintained. On the other hand, if the access is not performed normally, the I/O address area for the internal I/O device designated for environment configuration is changed. Thereafter, when the environment configuration operation is complete for all internal I/O devices, the above-described flag is reset.

Therefore, no matter which internal I/O device's address area the expansion device's I/O address area overlaps with, the expansion device and all of the internal I/O devices may be assigned to mutually exclusive I/O address areas. Moreover, where the system hangs due to an overlapping I/O address area, after a restart of the system it is automatically determined, by reference to the device ID, which internal I/O device caused the system to hang. The I/O address area assigned to the responsible internal I/O device is then changed. As a result, even where the system hangs due to an overlapping I/O address area, normal operation can be ensured merely by restarting the system.

In addition, the computer system of this invention is characterized in that it includes a means that boots the operating system where an internal I/O device's operation is stopped—i.e., where it is disabled—when an I/O address overlap is determined to exist. In this computer system, because the system startup occurs with the internal I/O device disabled, the operating system may boot normally even if an internal I/O device and an expansion device have overlapping I/O areas. In this case, internal I/O device environment configuration may be performed using the operating system's environment configuration function, an environment configuration function provided with an application program, a BIOS environment configuration function, etc.

Furthermore, the computer system of this invention is characterized in that it has a device detection means that detects the connection of an expansion device to the expansion connector, and when after power is supplied to the system a detection signal from the device detection means indicates that an expansion device is connected, the operating system boots with the internal I/O devices disabled. In this case, after the operating system boots, environment configuration for the internal I/O devices is performed using the operating system's environment configuration function, etc. It is further characterized in that when a certain operation (1), for example the pushing of a certain key, is detected after the power is turned on, the operating system boots with the internal I/O devices disabled. In this case, environment configuration of the internal I/O devices is performed using the environment configuration function, etc. built into the operating system. In addition, by equipping the system with a reset means and combining it with the process of (1), the system may boot without turning off the power if a certain operation is performed when the system hangs.

DESCRIPTION OF THE DRAWINGS

These and other advantages of the present invention are best understood with reference to the drawings, in which:

FIG. 2 is a diagram showing one example of the BIOS setup information in the computer system of FIG. 1;

FIG. 7 is a diagram showing the default interrupt level for each device in the computer system of FIG. 1;

FIG. 8 is a flow chart showing one part of the first environment configuration operation performed by the CPU when power to the computer system of FIG. 1 is turned on;

FIG. 9 is a flow chart showing the remaining part of the first environment configuration operation performed by the CPU when power to the computer system of FIG. 1 is turned on;

FIG. 10 is a flow chart showing the second environment configuration operation performed by the CPU when power to the computer system of FIG. 1 is turned on;

FIG. 11(a) is a flow chart showing the third environment configuration operation performed by the CPU when power to the computer system of FIG. 1 is turned on;

FIG. 11(b) is a flow chart showing an alternative embodiment of the third environment configuration operation performed by the CPU when power to the computer of FIG. 1 is turned on.

DETAILED DESCRIPTION OF THE PREFERRED EMBODIMENT

Figure 1:
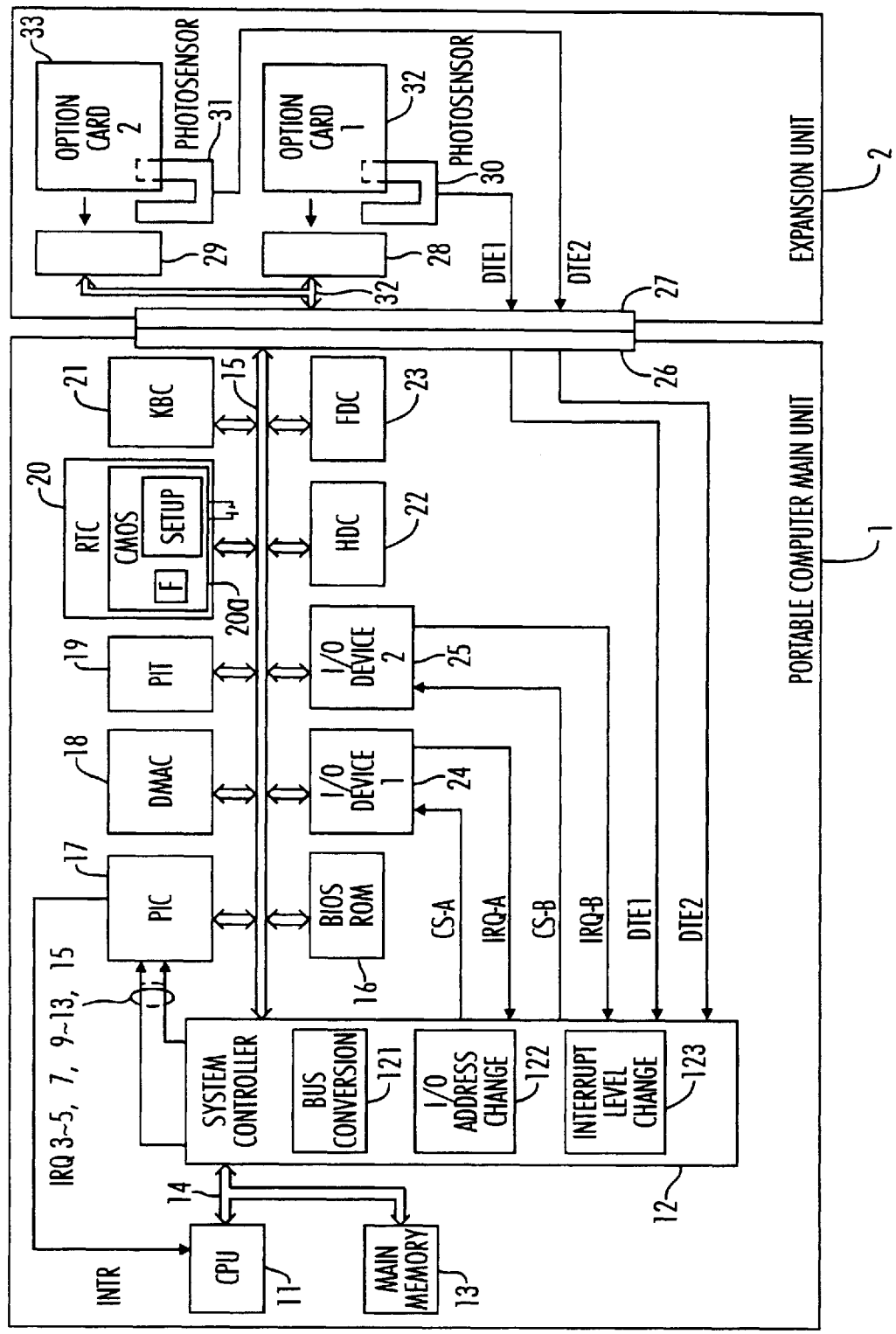
FIG. 1 is a block diagram showing the construction of the entire computer system pertaining to one embodiment of this invention.

FIG. 1 shows the construction of a computer system pertaining to the first embodiment of the present invention. This computer system comprises a laptop-type or notebook-type portable computer main unit 1 and an expansion unit 2 detachably connected to portable computer main unit 1.

The system board for the portable computer main unit 1 contains a CPU 11, a system controller 12 and a main memory 13. The CPU 11 and the main memory 13 are connected to a CPU local bus 14, which has a 32-bit wide data bus. The CPU local bus 14 is connected by means of a system controller 12 to an ISA-type system bus 15, which has a 16-bit wide data bus.

The above system board also contains a BIOS ROM 16, as well as various peripheral LSI chips essential to the system, i.e., an interrupt controller (PIC) 17, a DMA controller (DMAC) 18, a system timer (PIT) 19, a real-time clock (RTC) 20, a keyboard controller (KBC) 21, a hard disk controller (HDC) 22 and floppy disk controller (FDC) 23. These peripheral LSI chips are assigned to fixed I/O address areas determined in advance. In addition, the interrupt levels for each of the peripheral LSI chips are also fixed.

Furthermore, on the system board are located first and second I/O devices 24 and 25. These I/O devices 24 and 25 are connected to the system bus 15. The I/O devices 24 and 25 also comprise one of the LSI chips connected to the CPU 11, but are not essential to the construction of the system like the system timer 19 or the real-time clock 20 described above, and can be employed by the user when necessary by using the system BIOS setup function stored in, for example, a BIOS ROM 16.

The system construction set via the setup function is stored in a CMOS memory 20a of the real-time clock 20 as BIOS setup information. This CMOS memory 20a consists of CMOS SRAM backed up by battery. Set in the CMOS memory 20a are the BIOS setup information as well as various types of flags, such as an environment configuration flag (F) indicating that the setup routine is underway based on the BIOS setup information. One example of BIOS setup information is shown in FIG. 2.

In FIG. 2, as devices capable of environment configuration via the system BIOS, two serial ports (serial port 1, serial port 2), printer port 1 and an external floppy disk drive interface are shown. The BIOS setup information preserves, for each of these hardware devices, the default I/O address, the interrupt level (IRQ number), and information indicating whether the device is to be used (enable EN/disable DIS). This information can be set by the user by means of reading out the set up routine through a certain key input operation and designating the desired settings on the screen showing the setup routine.

In this way, the I/O devices 24 and 25 are used as controllers, etc. that control external peripheral devices connected to the serial ports and printer port.

Here, the serial ports are used to connect an RS-232C device, modem, serial mouse or other external peripheral device to portable computer main unit 1, and the printer port is a parallel port used to connect a printer or external floppy disk drive to portable computer main unit 1. In addition, it is possible to build into the portable computer main unit 1 as I/O devices 24 and 25 controllers to control various types of other peripheral devices not essential to the system, such as a controller for the sound card gate port, an expansion display controller or a SCSI interface controller, in addition to controllers for the serial ports and parallel port. Moreover, an I/O device 24 or 25 may also itself be a peripheral device, such as an internal modem.

The I/O devices 24 and 25 are respectively assigned to default I/O address areas, but the system is constructed such that those I/O address areas may be changed in software. Such an I/O address area change is carried out automatically when it is determined that the I/O address area for an option card described above overlaps with the I/O address area for the I/O device 24 or 25. Further, the interrupt levels for the I/O devices 24 and 25 can also be changed in software to values different from the default values. These automatic changes to the I/O address area and interrupt level of the I/O devices 24 and 25 are performed through the use of hardware logic located in the system controller 12 by the system BIOS of BIOS ROM 16.

In addition, an expansion connector 26 is contained in the portable computer main unit 1. This expansion connector 26 is connected to the system bus 15. Detachably connected to the expansion connector 26 is an expansion unit 2 used to expand the functions of the portable computer main unit 1.

The expansion unit 2 contains a connector 27, expansion slots including expansion connectors 28 and 29, as well as photosensors 30 and 31 to determine the presence of a card. The connector 27 has a configuration and pin placement scheme enabling it to connect to the expansion connector 26. Various types of expansion devices are detachably connected to each of a number of expansion units 28 and 29 belonging to the expansion unit 2. Expansion devices include modem cards, sound cards, graphics adaptercards, SCSI interface cards, multiple I/O cards and other types of ISA option cards, as well as PCMCIA-type IC cards. An example of a case in which an ISA option card is used as an expansion device is explained below.

For ISA option cards, the hardware resources necessary for use of such cards (e.g., I/O address area, interrupt level) are prescribed for each card. In addition, most ISA option cards have jumpers or dip switches that may by set by the user, and are constructed such that the I/O address area and the interrupt level may by changed by setting the jumpers or dip switches.

When the expansion unit 2 is connected to the computer main unit 1, the connectors in the expansion connectors 28 and 29 are connected to the system bus 15 of the computer main unit via an internal bus 32 and the connectors 26 and 27.

The photosensor 30 is a card detection device that detects whether option card 32 is connected to the expansion connector 28, and is located in the card insertion path of the expansion slot. As shown in the drawing, the photosensor 30 has two protrusions, one side of which is equipped with a photoemitter and the other side of which, facing the first, is equipped with a photoreceptor. When an option card 32 is connected to the expansion connector 28, the passage of light in the space between these two protrusions, that is, the space between the photoemitter and the photoreceptor, is obstructed by the insertion of the option card 32. In this event, the photosensor 30 generates a card detection signal DTE1 indicating that the option card 32 was inserted in the expansion slot. The card detection signal DTE1 is sent to the system controller 12 via the connectors 27 and 26, and a flag indicating the insertion of a card is thereupon set in a prescribed status register in the system controller 12.

The photosensor 31 is the same as the photosensor 30, and when the passage of light between the two protrusions is blocked by the insertion of an option card 33, card detection signal DTE2 indicating the insertion of the option card 33 is generated. Furthermore, reflective-type photosensors may be used as the photosensors 30 and 31 instead of light-permeable type photosensors as described above.

Card detection devices employing photosensors (light-permeable type or reflective type) as shown in this embodiment are most desirable from the standpoint of accuracy of detection, in terms of such points as reliability, durability and efficiency of space utilization, but card insertion may also be mechanically detected by means of a microswitch, for example, or through detection of a change in voltage to certain pins of the expansion connector.

The option cards 32 and 33 have address decoders that receive and decode the I/O addresses supplied from the system, determine whether these I/O addresses are the I/O addresses they requested, and said cards operate when it is determined that these I/O addresses are the I/O addresses they requested.

Next, the construction of the hardware to change the I/O address areas and interrupt levels for the I/O devices 24 and 25 will be explained. This hardware is located in the system controller 12.

In other words, the system controller 12 is intended to control memory and I/O in response to instructions from the CPU 11, and contains a bus conversion circuit 121, an I/O address change circuit 122 and a device interrupt level conversion circuit 123. The bus conversion circuit 121 is the data and address interface between the CPU local bus 14 and the system bus 15, and carries out conversion of the data bus and address bus width, etc.

The I/O address change circuit 122 is a decoder to perform variable setting of the I/O address areas for the above-described I/O devices 24 and 25. One example of the actual hardware construction of the I/O address change circuit 122 is shown in FIG. 3.

Figure 3:
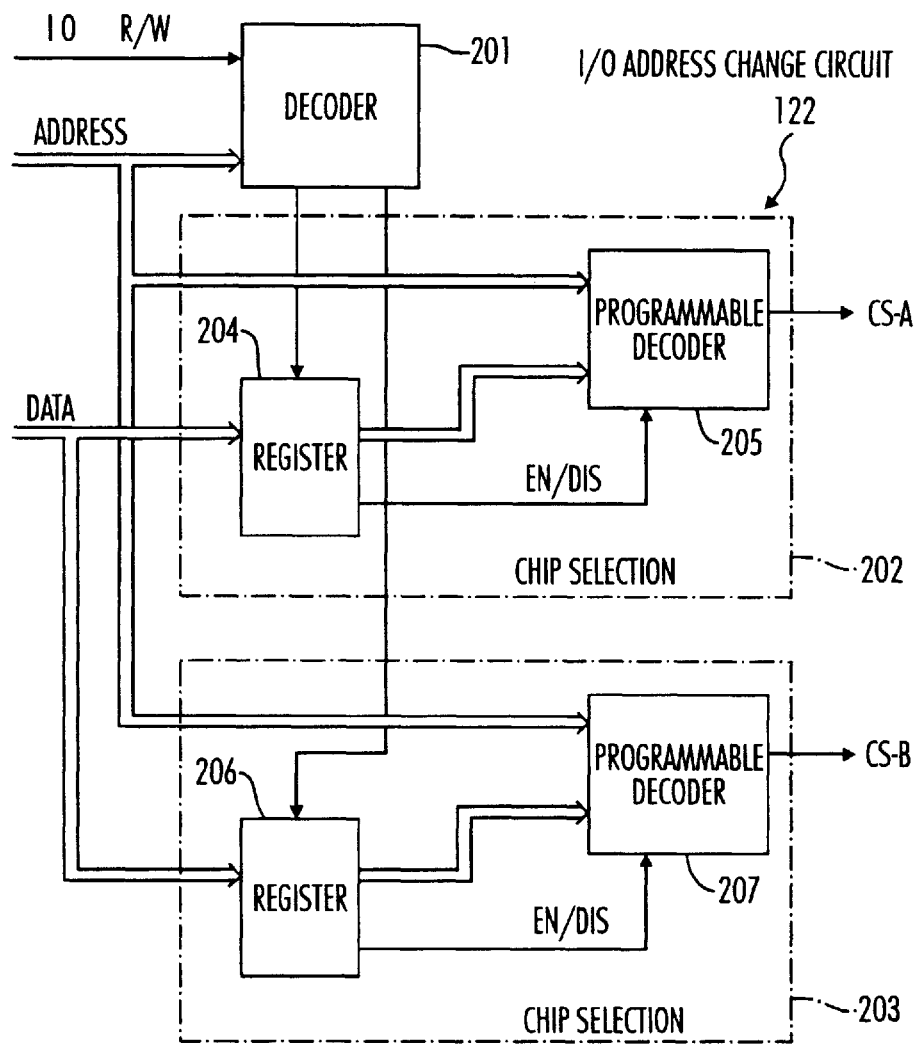
FIG. 3 is a block diagram showing one example of the detailed construction of the I/O address change circuit located in the computer system of FIG. 1.

As shown in FIG. 3, the I/O address change circuit 122 contains an address decoder 201 and a chip select signal generating circuits 202 and 203. The chip select signal generating circuit 202 generates a chip select signal CS-A. The chip select signal CS-A is supplied to the I/O device 24 as an enabling signal. Similarly, the chip select signal generating circuit 203 generates a chip select signal CS-B. The chip select signal CS-B is supplied to the I/O device 25 as an enabling signal.

The chip select signal generating circuit 202 comprises a register 204 and a programmable address decoder 205. The register 204 is an I/O register that may be re-written by software, and is connected to the system bus 15's data bus. The value indicating the range of the I/O address that is to be assigned to the I/O device 24 is set in the register 204 by the CPU 11. The value set in the register 204 is sent to the programmable address decoder 205. The programmable address decoder 205 is a decoder that can vary the conditions of decoding by means of the value set in the register 204, and it generates the chip select signal CS-A when the I/O address from the CPU 11 falls within the I/O address range designated by the value in the register 204. Furthermore, an enable/disable bit to permit or prohibit the generation of the chip select signal CS-A is set in the register 204 by CPU 11. If a disable bit is set, the programmable address decoder 205 is prohibited from operating (disabled), and the generation of the chip select signal CS-A is in this way prohibited.

The chip select signal generating circuit 203 is constructed in the same way as the chip select signal generating circuit 202, and comprises a register 206 and a programmable address decoder 207. The register 206 is an I/O register that may be re-written by software, and is connected to the system bus 15's data bus. The value indicating the range of the I/O address that is to be assigned to the I/O device 25 is set in the register 206. The value set in the register 206 is sent to the programmable address decoder 207. The programmable address decoder 207 is a decoder that can vary the conditions of decoding by means of the value set in the register 206, and it generates a chip select signal CS-B when the I/O address from the CPU 11 falls within the I/O address range designated by the value in the register 206. Furthermore, an enable/disable bit to permit or prohibit the generation of the chip select signal CS-B is set in the register 206 by the CPU 11. If a disable bit is set, the programmable address decoder 207 is prohibited from operating (disabled), and the generation of chip select signal CS-B is in this way prohibited.

When an I/O read/write signal (IO R/W) is supplied from the CPU 11 via the system bus 15, the address decoder 201 decodes the address in the system bus 15 (I/O address). When the I/O address designates the register 204, the address decoder 201 selects the register 204 as the port for read/write operation. Similarly, when the I/O address designates the register 206, the register 204 is selected as the port for read/write operation.

With the I/O address change circuit 122 constructed in this fashion, by changing the value set in the register 204, the I/O address range necessary for the generation of chip select signal CS-A may be freely changed. Similarly, by changing the value set in the register 206, the I/O address range necessary for the generation of the chip select signal CS-B may be freely changed. The programmable decoders 205 and 207 may be realized using match/no match detection circuits constructed such that they compare the high bit portion of the I/O address with the values in the registers 204 and 206, respectively, and generate the chip select signals CS-A and CS-B only in the event of a match.

Figure 4:
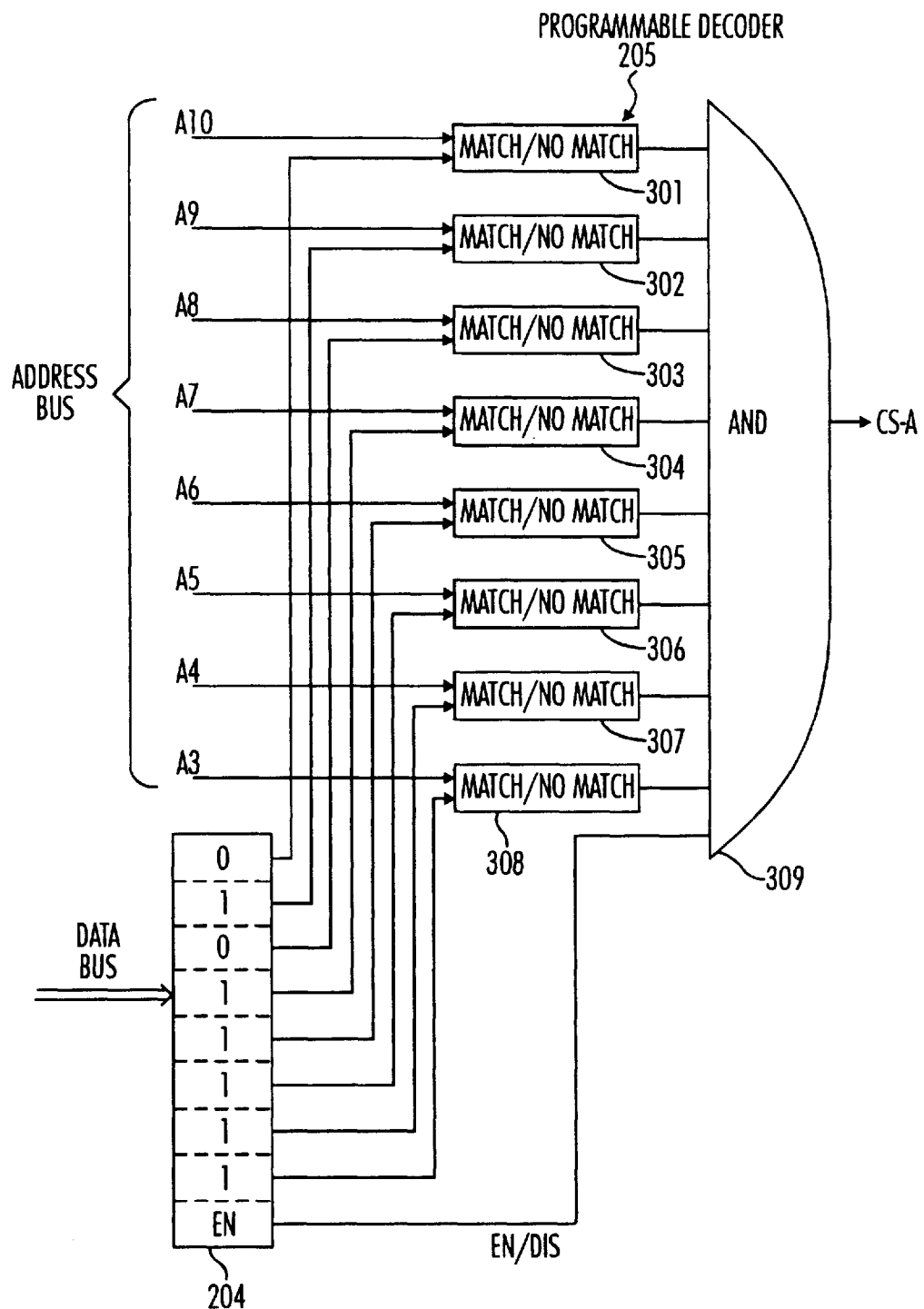
FIG. 4 is a circuit diagram showing one example of the detailed construction of the programmable decoder located in the I/O address change circuit of FIG. 3.

One example of the actual construction of the programmable decoder 205 is shown in FIG. 4. As shown in the drawing, the programmable decoder 205 comprises match/no match detection circuits 301 to 308, including XOR gates, etc., as well as AND circuit 309. When each device's I/O address area comprises eight bytes, the bottom three bits A0–A2 of the I/O address are not decoded, and only A3–A10 are decoded. Where I/O device 24's I/O address area is 2F8H to 2FFH, the eight data bits '01011111' indicating address 2F8H are set in register 204. In this case, if the enable/disable flag for register 204 is in an 'enable' state, and if bits A3–A10 of the I/O address in the system bus are '01011111', chip select signal CS-A is generated from the AND circuit 309.

Programmable decoder 206 also may have the same circuit construction.

Figure 5:
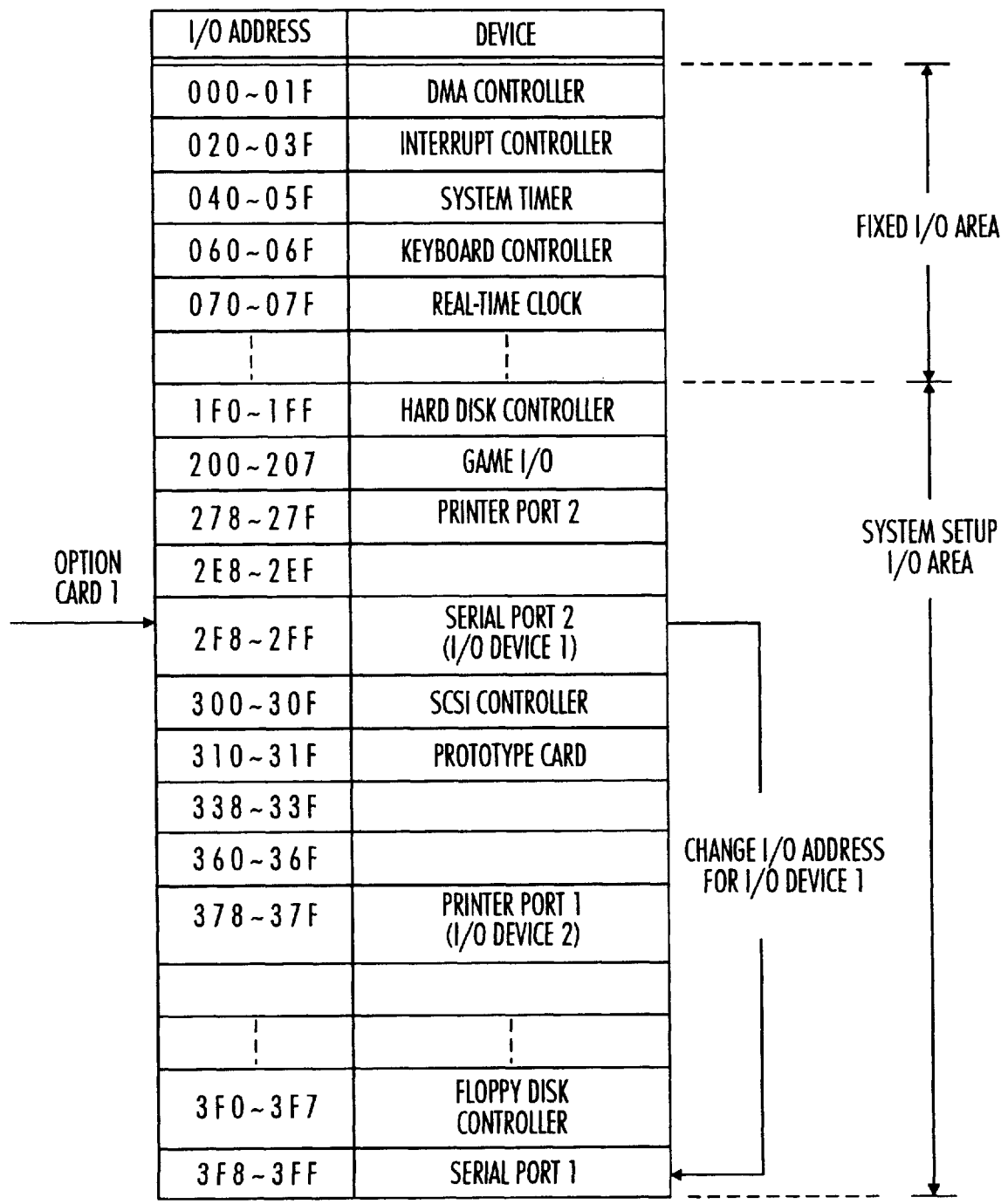
FIG. 5 is a diagram showing one example of the I/O address map in the computer system of FIG. 1.

One example of the I/O address map for the system in FIG. 1 is shown in FIG. 5.

As can be understood from this I/O address map, I/O address areas 000H to 1FFFH are reserved for devices essential to the system such as the interrupt controller 17 and the system timer 19, and these address areas cannot be used by the I/O devices 24 or 25 or by an option card. Therefore, the address areas that may be used by the I/O devices 24 or 25 or by an option card are 200H and above.

For example, if the case in which the first I/O device 24 is a controller to control a peripheral device such as a modem connected to serial port 2 is considered, I/O address area 2F8H-2FFH is allocated to I/O device 24 as the default value. This is because, as shown in FIG. 2, the default I/O address area for serial port 2 is 2F8H-2FFH. In this case, as shown in FIG. 4, the value that indicates base address 2F8H of I/O device 24's I/O address area is set in register 24.

Where the I/O address area for the option card 32 inserted in expansion connector 28 is set at 2F8H-2FFH by means of a jumper, etc., the setup information in the CMOS memory 20a and the value in the register 24 are rewritten, and the I/O address area for I/O device 24 is changed to a different I/O address area. For example, if it is changed to address area 3F8H-3FFH used by serial port 1, the value indicating the new I/O address area's base address 3F8H is set in register 204. If serial port 1 is in use, I/O device 24's I/O address area is changed to a different address area. The new I/O address area may be automatically determined in accordance with, for example, the status the I/O address area's use by another I/O device. The I/O address area's status of use may be recognized by reference to the EN/DIS data in the BIOS setup information in FIG. 2. Furthermore, the status of use of all devices, including option cards, and the hardware resources (such as I/O address area, interrupt level, etc.) allocated to them, are stored and managed in CMOS memory 20a, and the new I/O address area may also be determined using this information.

Figure 6:
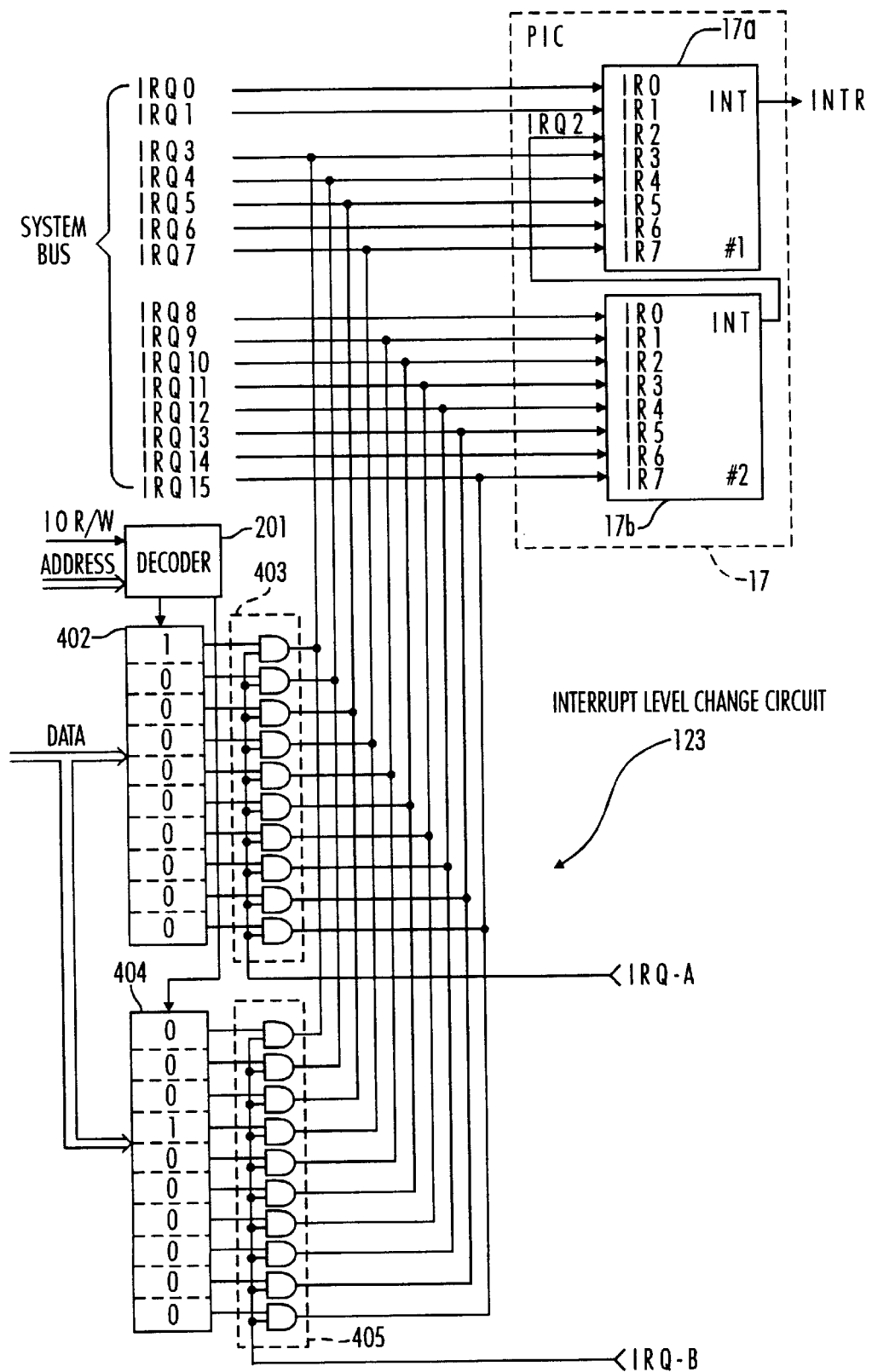
FIG. 6 is a circuit diagram showing one example of the detailed construction of the interrupt level change circuit located in the computer system of FIG. 1.

Next, the concept of changing interrupt levels using the device interrupt level change circuit 123 will be explained with reference to FIG. 6.

First, the interrupt controller 17 will be explained. The interrupt controller 17 comprises master and slave interrupt controller chips 17a and 17b connected in a cascade fashion, and has sixteen individual interrupt input elements (IR0–IR7, IR0–IR7) to receive hardware interrupt request signals IRQ0–IRQ15 having mutually exclusive interrupt levels. These interrupt input elements are all (with the exception of IRQ2's input element) connected to the system bus 15.

The interrupt controller 17 supervises the generation of hardware interrupt request signals IRQ0–IRQ15, and when any of these is generated, it supplies interrupt signal INTR to CPU 11. Interrupt signal INTR causes the CPU 11 to discontinue its current routine and perform an interrupt service routine in response to the interrupt source. Where multiple interrupt request signals are generated simultaneously, the interrupt service routine for the hardware interrupt request signal having the highest priority is performed. The order of priority for hardware interrupt request signals, that is, for interrupt levels, is as follows: IRQ0 is highest, followed by IRQ1, IRQ8–15 and IRQ3–7. IRQ0, IRQ1, IRQ2, IRQ6, IRQ8 and IRQ14 are already in use by the system timer 19, etc., and these interrupt levels may not be used by I/O devices 24 or 25 or by an option card.

The interrupt level change circuit 123 comprises registers 402 and 404 and gate circuits 403 and 405, as shown in the drawing.

Register 402 and gate circuit 403 are used to change the interrupt level for I/O device 24. Register 402 is an I/O register that may be re-written by software, and is connected to the system bus 15's data bus. The value designating the interrupt level for I/O device 24 is set in register 402. The value set in register 402 is sent to output gate circuit 403.

Output gate circuit 403 has ten individual two-input AND gates as shown in the drawing, and generates, in response to hardware interrupt request signal IRQ-A from I/O device 24, one of the following: IRQ3, IRQ4, IRQ5, IRQ7, IRQ9, IRQ10, IRQ11, IRQ12, IRQ13, or IRQ15. Here, the interrupt level generated is determined by the value set in register 402. For example, if '1000000000' is set in register 402, output gate circuit 403's first AND gate is opened and the interrupt request signal generated in response to IRQ-A is supplied to the interrupt input element corresponding to IRQ3 of interrupt controller 17. In this case, the interrupt level for I/O device 24 becomes IRQ3.

Register 404 and gate circuit 405 are used to change the interrupt level for I/O device 25. Register 404 is an I/O register that may be rewritten by software, and is connected to the system bus 15's data bus. The value designating the interrupt level for I/O device 25 is set in register 404. The value set in register 404 is sent to output gate circuit 405.

Output gate circuit 405 has ten individual two-input AND gates as shown in the drawing, and generates, in response to hardware interrupt request signal IRQ-B from I/O device 25, one of the following: IRQ3, IRQ4, IRQ5, IRQ7, IRQ9, IRQ10, IRQ11, IRQ12, IRQ13, or IRQ15. Here, the interrupt level generated is determined by the value set in register 404. For example, if '0001000000' is set in register 404, output gate circuit 405's fourth AND gate is opened and the interrupt request signal generated in response to IRQ-B is supplied to the interrupt input element corresponding to IRQ7 of the interrupt controller 17. In this case, the interrupt level for I/O device 25 becomes IRQ7.

With interrupt level change circuit 123 constructed in this fashion, the interrupt levels for I/O devices 24 and 25 may be freely changed by changing the values set in registers 402 and 404.

In FIG. 7, the default interrupt levels for each device in FIG. 1 are shown.

As may be understood from FIG. 7, IRQ0, IRQ1, IRQ2, IRQ6, IRQ8 and IRQ14 are used by devices essential to the system such as system timer 19. If we consider the case in which the first I/O device is a controller to control a peripheral device connected to serial port 2, interrupt level IRQ3 is allocated to I/O device 24 as a default value. This is because, as shown in FIG. 2, the default interrupt level for serial port 2 is IRQ3. In this case, '1000000000' is set in register 402, as shown in FIG. 6.

Where the I/O address area for option card 32 inserted in expansion connector 28 is set by means of a jumper, etc. to 2F8H-2FFH, the same as for serial port 2, not only is the I/O address area for I/O device 24 changed, but the interrupt level is also changed to a different level. For example, if the I/O address area for I/O device 24 is changed to address area 3F8H-3FFH used by serial port 1, the interrupt level for I/O device 24 is changed accordingly to interrupt level IRQ4 used by serial port 1. This interrupt level change is carried out by setting '0100000000' in register 402.

Next, the environment configuration operation for determining the I/O address areas and interrupt levels for I/O devices 24 and 25 is explained. When the power to the system is turned on, or when there is a system reset, environment configuration is carried out by the system BIOS in BIOS ROM 16.

First, the first method for environment configuration will be explained. This first method may be summarized as follows.

As described above, the operating environment, including the allocation of hardware resources such as I/O address area and interrupt level, may be changed for all internal devices in the portable computer main unit 1 (of which I/O devices 24 and 25 are shown as representative examples in FIG. 1) excluding devices essential to the system such as the system timer 19 and the real-time clock. The default status for I/O devices 24 and 25 is set at disabled, and during the period between power ON or system reset and environment configuration for either I/O device 24 or 25, it is maintained at disabled regardless of the contents of the BIOS setup information.

The system BIOS performs environment configuration for I/O device 24 and I/O device 25 in sequence. Before environment configuration is begun, an environment configuration flag of '1', indicating that environment configuration has begun, is saved in CMOS memory 20a. In addition, the device ID indicating the device for which environment configuration is being performed is also saved in CMOS memory 20a. The environment configuration flag is reset to '0' when environment configuration is completed for both I/O device 24 and I/O device 25.

During environment configuration for an I/O device for which environment configuration may be performed, e.g., for I/O device 24, it is determined whether the default I/O address area for I/O device 24 overlaps with the address areas requested for option cards 32 or 33. The existence or non-existence of this overlap is determined by whether I/O device 24 is accessed normally after I/O device 24 is enabled.

If the I/O addresses overlap, access fails. When this happens, the I/O address area for I/O device 24 is changed to an I/O address area different from the default I/O address area. In addition, if the system hangs when I/O device 24 is accessed, the user is expected to re-boot the system. In this case, the system BIOS recognizes the device causing the overlapping I/O address areas from the device ID in CMOS memory 20a and changes the I/O address area for that device. In this way, overlapping I/O address areas for I/O devices 24 and 25 and option cards 32 and 33 may be prevented, and the operating system may be booted normally.

Figure 8:
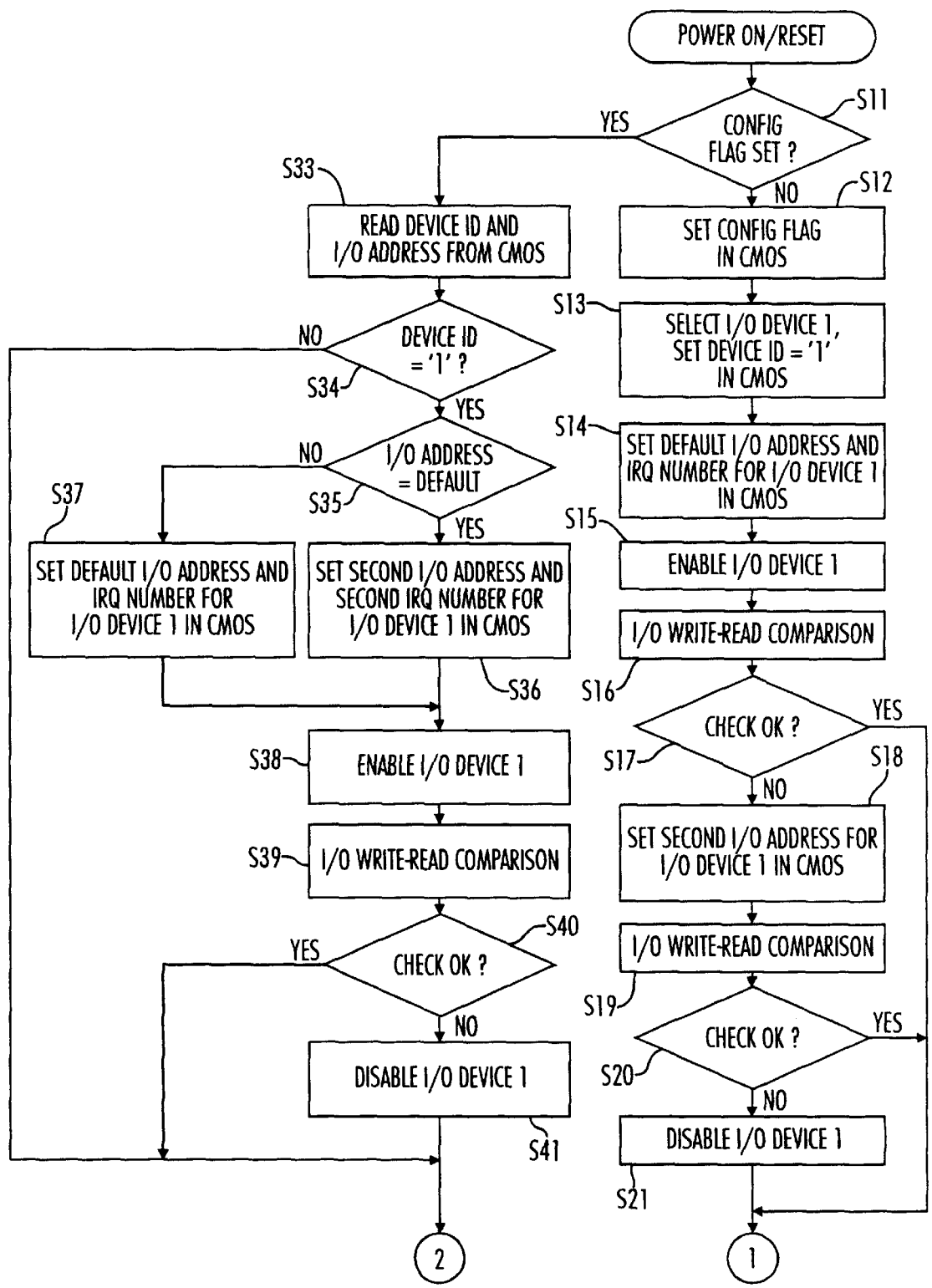
Figure 9:
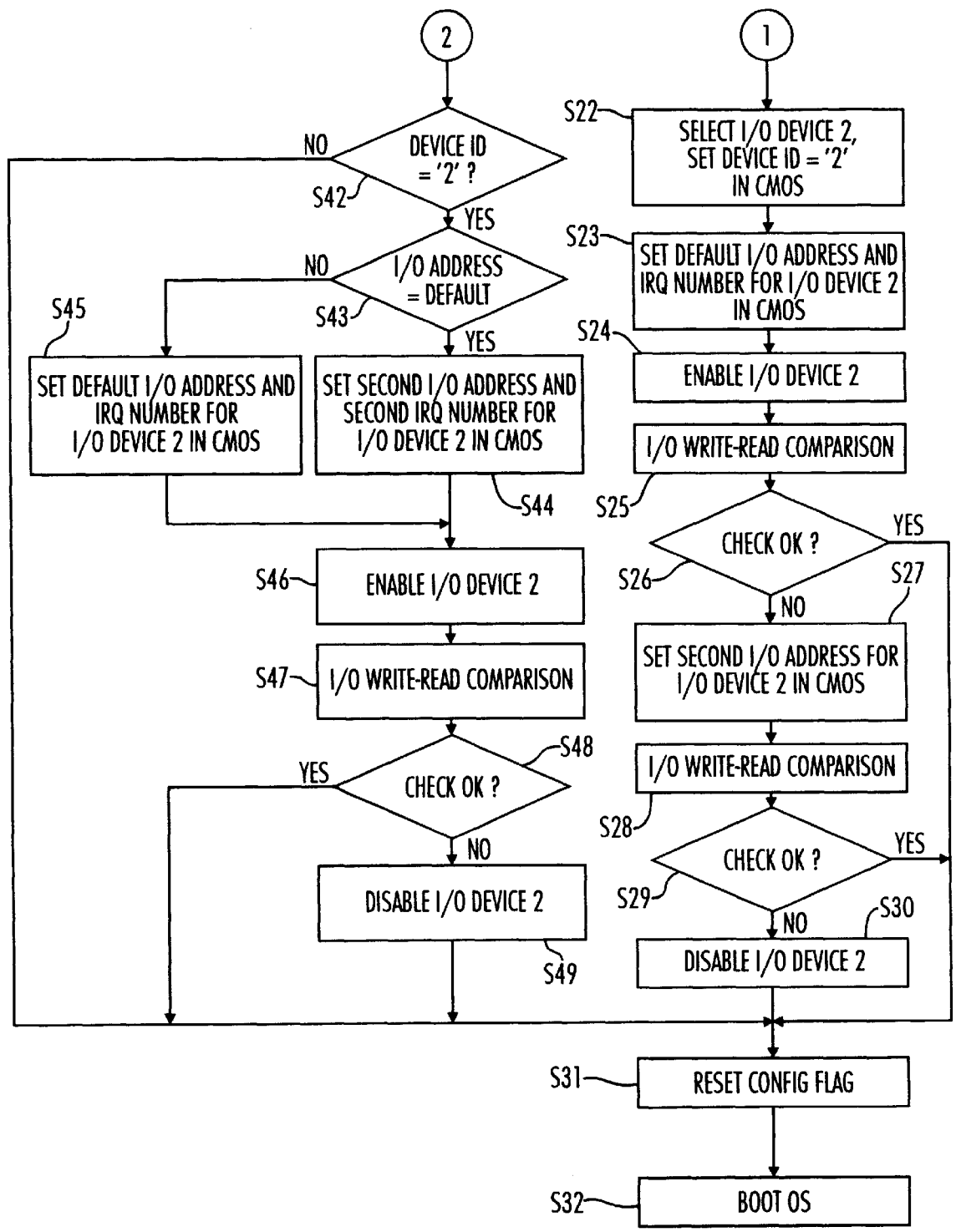

The first method of environment configuration is explained in detail below with reference to the flow charts in FIGS. 8 and 9.

In response to a system power on or a system reset, the system BIOS is run by the CPU 11. After performing memory initialization and reliability checking, etc., the system BIOS performs initialization and reliability checking of the peripheral LSI chips. Environment configuration in order to properly allocate hardware resources to I/O devices 24 and 25 is performed during peripheral LSI chip initialization and reliability checking.

During this environment configuration operation, the system BIOS first determines whether an environment configuration flag of '1' is stored in CMOS memory 20a, and from this it determines whether this indicates a system restart (system power on or system reset) after a system hang caused by an I/O address conflict (step S11).

When an environment configuration flag of '1' is not stored, in other words when it is a normal system startup, the system BIOS follows the routine set out in steps S12 to S30. If, on the other hand, an environment configuration flag of '1' is stored, in other words, if it is a system startup following a system hang caused by an I/O address conflict, the system BIOS follows the routine set out in steps S33 to S49.

During a normal system startup, the system BIOS first writes an environment configuration flag of '1' into CMOS memory 20a (step S12). The system BIOS then selects first I/O device 24 as the first device for environment configuration, and stores the device ID (ID='1') indicating first I/O device 24 in CMOS memory 20a (step S13). Next, the system BIOS stores the top address of first I/O device 24's default I/O address area, as well as the default interrupt level (IRQ number), in CMOS memory 20a (step S14), and then enables I/O device 24 (step S15). In this enabling of I/O device 24, the system BIOS stores the enable flag and top address of the default I/O address area in register 204.

Next, in order to determine the existence or non-existence of an I/O address area overlap, the system BIOS outputs a designated I/O address falling within the default address area to the system bus 15, performs access of the I/O port for I/O device 24 designated by said I/O address, and checks whether or not the access is performed normally (step S16).

In the I/O access checking operation, it is desirable to read the status data from the status register in I/O device 24, and to check whether or not the desired status may be read out. If there is no I/O address area overlap the desired status may be read out, but if there is an I/O address area overlap, data bus contention causes difficulties such as corrupted data, etc. It is more desirable to perform checking by means of so-called write-read comparison. In this event, write access in order to write designated write data to I/O device 24's data register, and read access to read out data from the data register, are performed in sequence, and the data read out from the data register is compared with the write data. If they match, it is determined that there is no I/O address area overlap, but if they do not match, it is determined that there is an I/O address area overlap. If checking is performed by means of write-read comparison, both write access and read access may by checked, and so it may be determined for certain whether the I/O addresses overlap.

If checking is performed successfully, the default I/O address area and interrupt level for I/O device 24 are established as correct values, and said I/O address area and interrupt level are allocated to I/O device 24 as hardware resources. Subsequently, the system BIOS proceeds to perform the environment configuration procedure for I/O device 25 set out in steps 22 onward.

On the other hand, if the checking operation fails, the system BIOS performs the same operation for the second I/O address area candidate allocable to I/O device 24 (steps S18–S20). It is prescribed beforehand what I/O address area will be deemed the second I/O address area candidate. It is also possible to determine whether another device is in use by referring to the BIOS setup information shown in FIG. 2, and to select an I/O address area not in use, such as an I/O address area allocated to an unused device, as the second candidate.

The system BIOS writes into CMOS memory 20a the value indicating the second candidate I/O address area (step S18), and then sets in register 204 the value indicating the second candidate I/O address area and performs write-read comparison checking of the second candidate I/O address area (steps S19–S20).

If the checking operation is successful, that is, if the second candidate I/O address area does not overlap, the system BIOS fixes the second candidate I/O address area and the default interrupt level as hardware resources for I/O device 24. The system BIOS then proceeds to the environment configuration procedure for I/O device 25 set out in steps 22 onward.

On the other hand, if the checking operation fails, that is, if the second candidate I/O address area overlaps with the I/O address areas for option cards 32 or 33, the system BIOS disables I/O device 24 in order to prevent a bootstrap error in the operating system (step S21). In this disabling operation, the EN/DIS flag for I/O device 24 residing in the BIOS setup information is changed to a disable (DIS) state and a disable flag is set in register 204. As a result, access to I/O device 24 is prohibited, and normal access to option cards 32 or 33 is secured. The system BIOS then proceeds to the environment configuration procedure for I/O device 25 set out in steps 22 onward.

The environment configuration process for second I/O device 25 is the same as that for first I/O device 24, described above.

In other words, the system BIOS stores the device ID (ID='2') indicating second I/O device 25 in CMOS memory 20a. Next, the system BIOS stores the top address of second I/O device 25's default I/O address area, as well as the default interrupt level (IRQ number) in CMOS memory 20a (step S23), and then enables second I/O device 25 (step S24). In this enabling of second I/O device 25, the system BIOS stores the enable flag and top address of the default I/O address area in register 206.

Next, in order to determine the existence or non-existence of an I/O address area overlap, the system BIOS sets in register 206 the value indicating the default I/O address area and then performs write-read comparison checking of the default I/O address area (steps S25–S26).

If checking is performed successfully, the default I/O address area and interrupt level for second I/O device 25 are established as correct values, and said I/O address area and interrupt level are allocated to second I/O device 25 as hardware resources. The system BIOS then rewrites the environment configuration flag in CMOS memory 20a to '0', indicating the completion of environment configuration (step S31), and then performs a bootstrap operation to load the operating system into the main memory 13 (step S32).

On the other hand, if the checking operation fails, the system BIOS performs the same operation for the second I/O address area candidate allocable to second I/O device 25 (steps S27–S29).

In other words, the system BIOS writes into CMOS memory 20a the value indicating the second candidate I/O address area (step S27), and then sets in register 206 the value indicating the second candidate I/O address area and performs write-read comparison checking of the second candidate I/O address area (steps S28–S29).

If the checking operation is successful, that is, if the second candidate I/O address area does not overlap, the system BIOS fixes the second candidate I/O address area and the default interrupt level as hardware resources for second I/O device 25. The system BIOS then rewrites the environment configuration flag in CMOS memory 20a to '0', indicating the completion of environment configuration (step S31), and then performs a bootstrap operation to load the operating system into main memory 13 (step S32).

On the other hand, if the checking operation fails, that is, if the second candidate I/O address area overlaps with the I/O address areas for option cards 32 or 33, the system BIOS disables second I/O device 25 in order to prevent a bootstrap error in the operating system (step S30). In this disabling operation, the EN/DIS flag for the second I/O device 25 residing in the BIOS setup information is changed to a disable (DIS) state and a disable flag is set in register 206. As a result, access to second I/O device 25 is prohibited, and normal access to option cards 32 or 33 is secured. The system BIOS then rewrites the environment configuration flag in CMOS memory 20a to '0', indicating the completion of environment configuration (step S31), and then performs a bootstrap operation (step S32).

Next, the situation in which an environment configuration flag of '1' is stored in CMOS memory 20a, that is, in which a system restart following a system hang due to an I/O address overlap occurs, will be explained.

Where an environment configuration flag of '1' is stored in CMOS memory 20a, the system BIOS reads in the device ID and I/O address from CMOS memory 20a (step S33) and determines whether or not the device ID is '1' (step S34). If the device ID is '1', the system BIOS recognizes that the first I/O device 24 was the cause of the system hang, and changes the I/O address area and interrupt level for I/O device 24 (steps S35–S37).

In this operation to change the I/O address area and interrupt level for I/O device 24, the system BIOS first determines whether the value for the I/O address area read from CMOS memory 20a is the same as that for the default I/O address area for the first I/O device 24 (step S35). If it is, the system BIOS changes the I/O address area and interrupt level for I/O device 24 from their default values to the second candidate values (step S36), and if it is not the same, the default I/O address area and interrupt level are each changed to the default value (step S37). The base address and IRQ number for the new I/O address area are stored in CMOS memory 20a.

Next, the system BIOS enables I/O device 24 (step S38). In this operation to enable I/O device 24, the system BIOS stores an enable flag as well as the base address for the new I/O address in register 204 of I/O address change circuit 122, and stores the IRQ number of the new I/O address area in register 402 of interrupt level change circuit 123. The system BIOS then performs write-read comparison checking to determine whether there is an overlap with the changed I/O address area (steps S39–S40).

If checking is performed successfully, the changed I/O address area and interrupt level are established as correct values, and said I/O address area and interrupt level are allocated to I/O device 24 as hardware resources. The system BIOS then rewrites the environment configuration flag in CMOS memory 20a to '0', indicating the completion of environment configuration (step S31), and then performs a bootstrap operation to load the operating system into the main memory 13 (step S32).

On the other hand, if the checking operation fails, the system BIOS disables I/O device 24 in order to prevent a bootstrap error in the operating system (step S41). In this disabling operation, the EN/DIS flag for I/O device 24 residing in the BIOS setup information is changed to a disable (DIS) state and a disable flag is set in register 204 of the I/O address change circuit 122. As a result, access to I/O device 24 is prohibited, and normal access to option cards 32 or 33 is secured. The system BIOS then rewrites the environment configuration flag in CMOS memory 20a to '0', indicating the completion of environment configuration (step S31), and then performs a bootstrap operation (step S32).

Where the device ID is '2', the I/O address area and interrupt level are changed using the identical procedure, and checking is performed on the changed I/O address area (steps S42–S49).

Under this first method, if the I/O address area requested by option cards 32 or 33 matches the default I/O address area for I/O device 24, the I/O address area allocated to I/O device 24 is automatically changed from the default value to a different value. Similarly, if the I/O address area requested by option cards 32 or 33 matches the default I/O address area for I/O device 25, the I/O address area for I/O device 25 is automatically changed. Consequently, no matter what value at which the I/O address area requested by option cards 32 or 33 is set, an overlap between the I/O address areas for option cards 32 or 33 and internal I/O devices 24 or 25 may be prevented. Therefore, the user may install ready-made option cards 32 and 33, such as ISA cards, without having to be concerned about setting jumpers or dip switches.

In addition, where there is a system hang due to an I/O address overlap, it is automatically determined, by looking at the device ID after a system restart, which internal device's I/O address area's overlap caused the system hang. The I/O address area for the I/O device causing the system hang is then changed. Thus, even where there is a system hang due to an I/O device overlap, all the user needs to do to have the system operate normally is restart the power switch.

Next, the second method for environment configuration for I/O devices 24 and 25 will be explained. A summary of the method is set out below.

The default status for I/O devices 24 and 25 is set at disabled, and during the period between power ON or system reset and environment configuration for either I/O device 24 or 25, it is maintained at disabled regardless of the contents of the BIOS setup information.

The system BIOS perform environment configuration for I/O device 24 and I/O device 25 in sequence, and before environment configuration is begun, an environment configuration flag of '1', indicating that environment configuration has begun, is saved in CMOS memory 20a. The environment configuration flag is reset to '0' when environment configuration is completed for both I/O device 24 and I/O device 25.

During environment configuration for an I/O device, e.g., for I/O device 24, it is determined whether the default I/O address area for I/O device 24 overlaps with the address areas requested for option cards 32 or 33. The existence or non-existence of this overlap is determined by whether I/O device 24 is accessed normally after I/O device 24 is enabled.

If the I/O addresses overlap, access fails. In this event, the system BIOS carries out bootstrapping with both I/O device 24 and I/O device 25 disabled. In this way, the operating system may be loaded and operated normally even if the I/O address areas for I/O devices 24 and 25 and option cards 32 and 33 overlap. Furthermore, when the system hangs after access of I/O device 24, the user is expected to re-boot the system. In this case, the system BIOS carries out bootstrapping without performing environment configuration for I/O devices 24 and 25 and with both I/O devices disabled. Because I/O devices 24 and 25 are disabled, the operating system boots normally. Environment configuration for I/O devices 24 and 25 is done using a utility program under the operating system or through the system BIOS setup routine.

Figure 10:
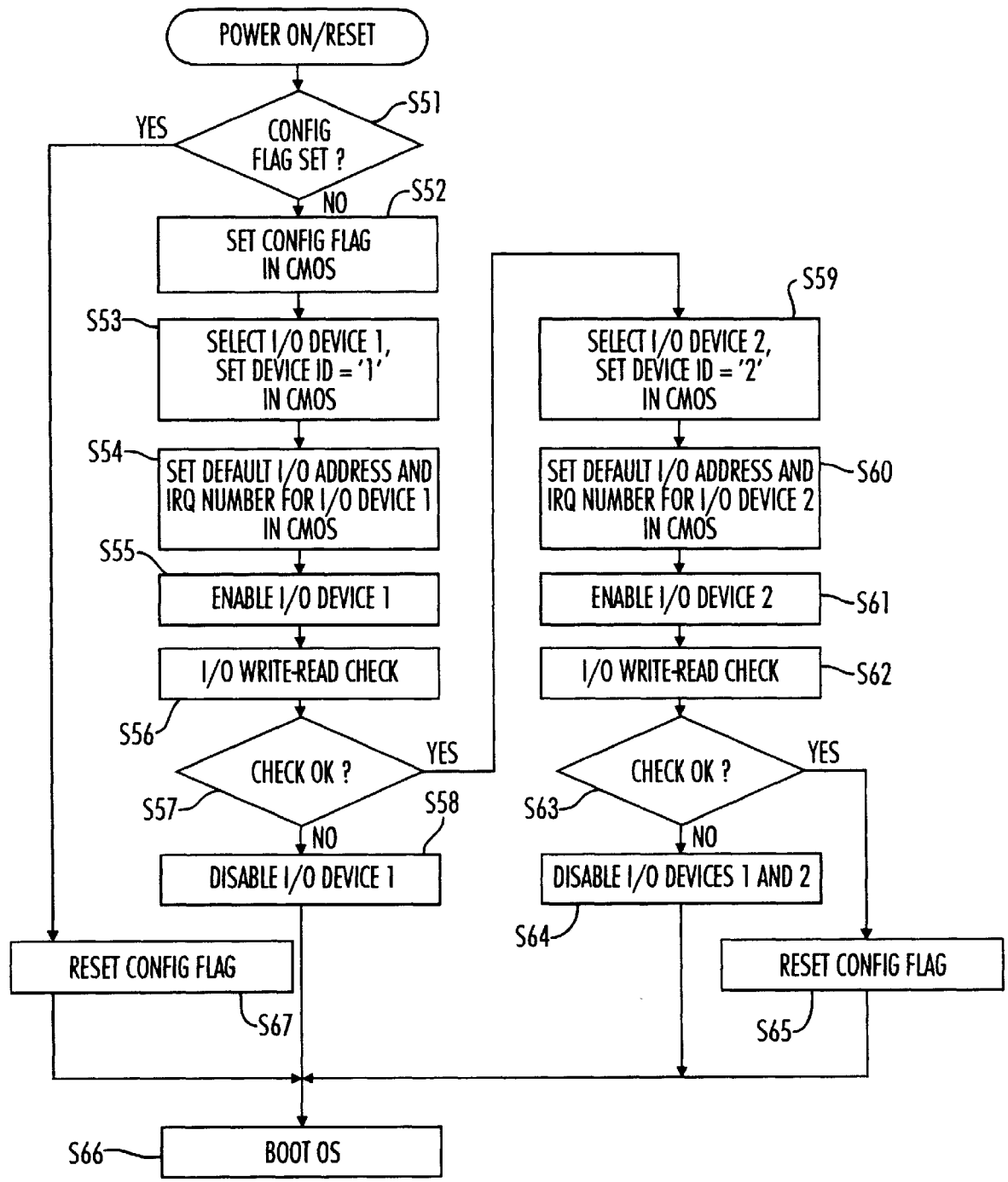

The second method of environment configuration will now be explained in detail below with reference to the flow chart in FIG. 10.

The system BIOS first determines whether an environment configuration flag of '1' is stored in CMOS memory 20a, and from this it determines whether it indicates a system restart (system power on or system reset) after a system hang caused by an I/O address conflict (step S51).

When an environment configuration flag of '1' is not stored, in other words when it is a normal system startup, the system BIOS follows the environment configuration routine set out in steps S52 to S66.

In this environment configuration routine, the system BIOS first writes an environment configuration flag of '1' into CMOS memory 20a (step S52). The system BIOS then selects first I/O device 24 as a device for environment configuration, and stores the device ID (ID='1') indicating first I/O device 24 in CMOS memory 20a (step S53). Next, the system BIOS stores the base address of first I/O device 24's default I/O address area, as well as the default interrupt level (IRQ number), in CMOS memory 20a (step S54), and then enables I/O device 24 (step S55). In this enabling of I/O device 24, the system BIOS stores the enable flag and top address of the default I/O address area in register 204 of I/O address change circuit 122.

Next, in order to determine the existence or non-existence of an I/O address area overlap, the system BIOS outputs a designated I/O address falling within the default address area to the system bus 15, performs access of the I/O port for I/O device 24 designated by said I/O address, and checks whether or not the access is performed normally (steps S56–S57). This I/O access checking is performed by means of write-read comparison as with the first method.

If the checking operation fails, the system BIOS disables I/O device 24 (step S58). In this disabling operation, the EN/DIS flag for I/O device 24 in the BIOS setup information is changed to a disabled (DIS) state, and a disable flag is set in register 204 of I/O address change circuit 122. As a result, access of I/O device 24 is prohibited. The system BIOS then performs bootstrapping to load the operating system into the main memory 13 (step S66). Because this bootstrapping is performed with I/O devices 24 and 25 disabled, the system can boot normally.

On the other hand, if checking is performed successfully, the default I/O address area and interrupt level for I/O device 24 are established as correct values, and said I/O address area and interrupt level are allocated to I/O device 24 as hardware resources. Subsequently, the system BIOS proceeds to perform the environment configuration procedure for I/O device 25 set out in steps 59 onward.

In other words, the system BIOS selects second I/O device 25 as the device on which to perform environment configuration, and stores the device ID indicating second I/O device 25 (ID='2') in CMOS memory 20a (step S59). Next, the system BIOS stores the top address of second I/O device 25's default I/O address area, as well as the default interrupt level (IRQ number) in CMOS memory 20a (step S60), and then enables second IO device 25 (step S61). In this enabling of second I/O device 25, the system BIOS stores the enable flag and base address of the default I/O address area in register 206 of I/O address change circuit 122.

Next, in order to determine the existence or non-existence of an I/O address area overlap, the system BIOS outputs a designated I/O address falling within the default address area to the system bus 15, performs access of the I/O port for I/O device 25 designated by said I/O address, and checks whether or not the access is performed normally (steps S62–S63). This I/O access checking is performed by means of write-read comparison.

If the checking operation fails, the system BIOS disables I/O devices 24 and 25 (step S64). In this disabling operation, the EN/DIS flags for I/O devices 24 and 25 in the BIOS setup information are changed to a disabled state, and a disable flag is set in registers 204 and 206 of I/O address change circuit 122. As a result, access of I/O devices 24 and 25 is prohibited. The system BIOS then performs bootstrapping to load the operating system into the main memory 13 (step S66). Because this bootstrapping is performed with I/O devices 24 and 25 disabled, the system can boot normally.

On the other hand, if checking is performed successfully, the default I/O address area and interrupt level for I/O device 25 are established as correct values, and said I/O address area and interrupt level are allocated to I/O device 25 as hardware resources. Subsequently, the system BIOS resets the environment configuration flag in CMOS memory 20a to '0' (step S65), and then performs bootstrapping (step S66).

Next, the case in which an environment configuration flag of '1' is stored in CMOS memory 20a, that is, operation after a system restart due to a system hang caused by an I/O address overlap, will be explained.

Where an environment configuration flag of '1' is stored in CMOS memory 20a, the system BIOS resets the environment configuration flag in CMOS memory 20a to '0' without performing environment configuration of I/O devices 24 or 25 (step S67). Bootstrapping is then performed with I/O devices 24 and 25 in a disabled state (step S66). In this case, environment configuration for I/O devices 24 and 25 may be performed after boot-up of the operating system by rewriting the system BIOS setup information by means of a utility program that runs under the operating system to change the system setup, or by means of a BIOS setup routine, and by thereafter re-booting the system.

Under this second method, if an I/O address area overlap is determined to exist, the operating system boots with I/O devices 24 and 25 disabled. Therefore, the operating system may boot normally even if there is an I/O address area conflict between I/O devices 24 or 25 and option cards 32 or 33.

Next, a third method of environment configuration for I/O devices 24 and 25 is explained. This third method is summarized as follows.

Under the third method, it is determined after a system restart whether option card 32 or 33 is connected to expansion connector 28 or 29, and if one of them is, the system boots with I/O devices 24 and 25 disabled.

Figure 11:
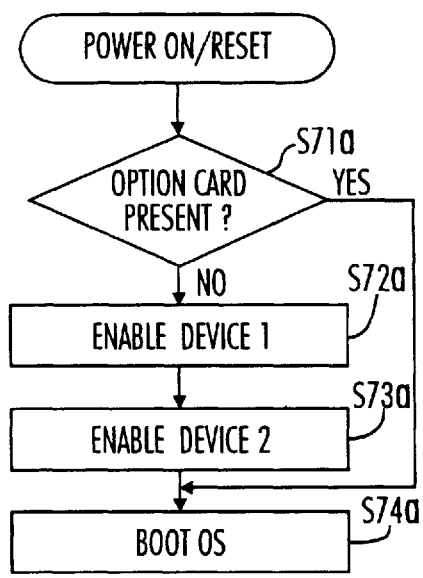
Figure 11:
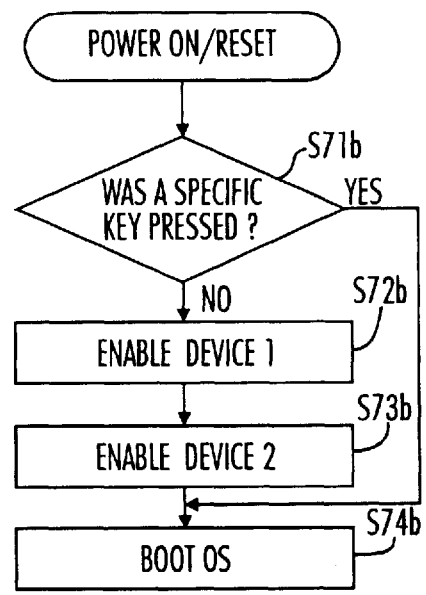

The third method of environment configuration is explained in detail below with reference to the flow charts in FIGS. 11(a) and (b).

In response to a system power on or a system restart, the system BIOS detects whether option card 32 or 33 is connected to either expansion connector 28 or 29 (step S71a). This detection is performed in response to values indicating card detection signals DTE1 or DTE2 from photosensors 30 or 31. These values indicating card detection signals DTE1 or DTE2 are recognized by means of the system BIOS reading the contents of a register in the system controller 12, in which the values indicating card detection signals DTE1 and DTE2 are set.

If option cards 32 and 33 are not connected to the computer, I/O devices 24 and 25 are enabled by means of setting an enable flag in registers 204 and 206 of I/O address change circuit 122 in sequence (steps S72a and S73a). In this case, a default I/O address area and interrupt level corresponding to I/O device 24 are allocated to I/O device 24, and a value indicating the top address of the default I/O address area and the IRQ number of the interrupt level are set in register 204 of I/O address change circuit 122 and register 402 of the interrupt level change circuit 123, respectively. In addition, a default I/O address area and interrupt level corresponding to I/O device 25 are allocated to I/O device 25, and a value indicating the top address of the default I/O address area and the IRQ number of the interrupt level are set in register 206 of the I/O address change circuit 122 and register 404 of the interrupt level change circuit 123, respectively. The system BIOS then boots the system (step S74a).

On the other hand, if option card 32 or option card 33 is connected to the computer, the system BIOS does not perform said environment configuration operation for I/O devices 24 and 25 (steps S72a and S73a), but instead boots the system while I/O devices 24 and 25 are in a disabled state (step S74a). In this case, environment configuration for I/O devices 24 and 25 may be performed after boot-up of the operating system by rewriting the system BIOS setup information by means of a utility program that runs under the operating system to change the system setup, or by means of a BIOS setup routine, and by hereafter re-booting the system.

Preferably, I/O devices 24, 25 may be disabled by pushing a predefined key. When a specific key is pressed (step S74b), I/O devices are not enabled (steps S72b or S73b). The test in FIG. 11(b) may be in addition to or instead of the test in FIG. 11(a).

In this way, under the third method, when detection signals from photosensors 30 and 31 sent after power is supplied to the system indicate that option cards are connected to the computer, the operating system boots with I/O devices 24 and 25 in a disabled state. Therefore, even if an I/O address area overlap occurs, the operating system can boot without inviting a system hang.

In this way, in the system of this embodiment, among devices on the system board, by constructing all devices other than those devices essential to the operation of the system such as the system timer 19 and the real-time clock 20, i.e., I/O devices 24 and 25, such that their environment may be configured and changed, hardware resources allocated to I/O devices 24 and 25 may be changed in response to the hardware resources requested by option cards 32 and 33. As a result, a computer system that always operates normally, regardless of the values set for option cards 32 and 33, may be realized.

Figure 12:
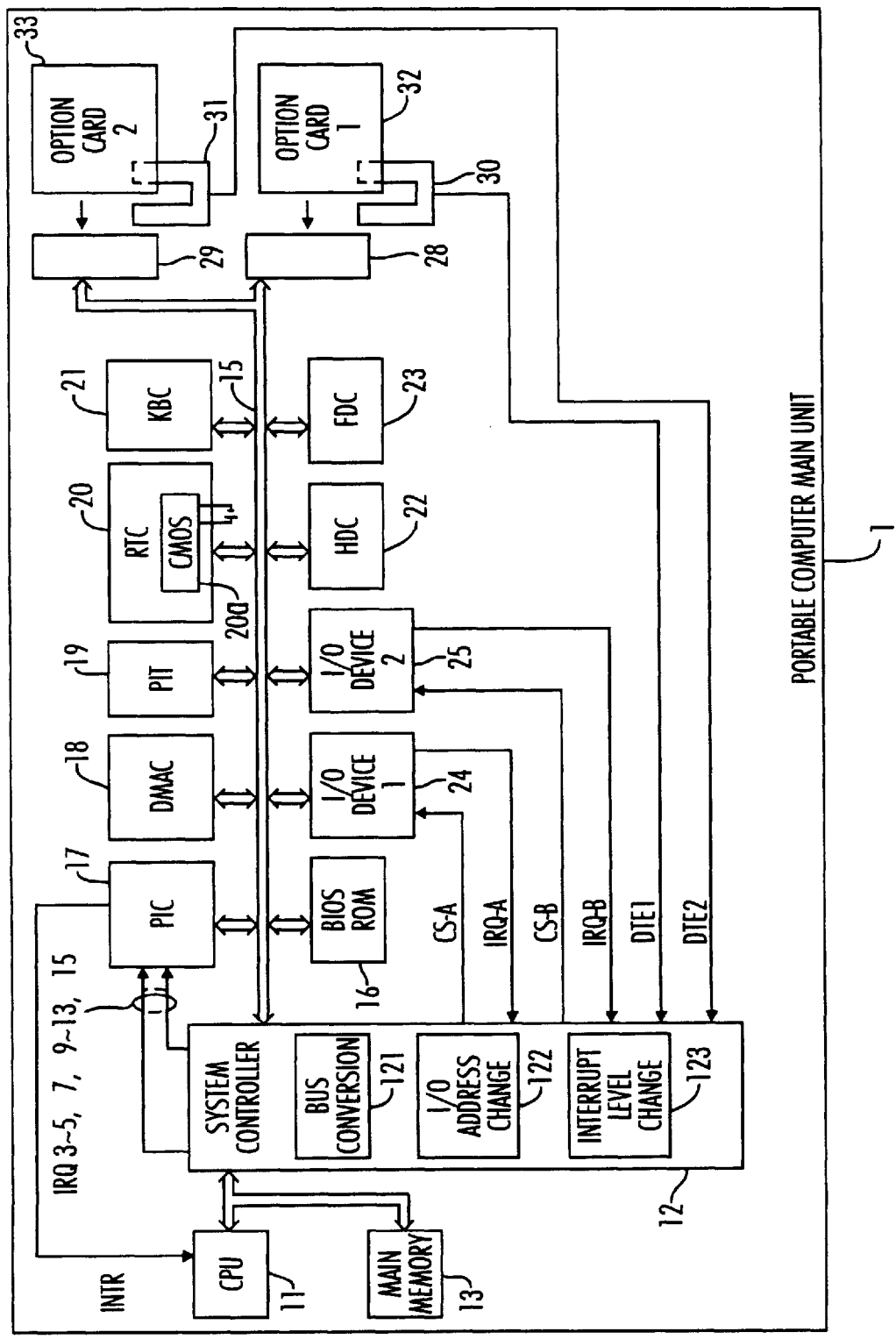
FIG. 12 is a block diagram showing an example of a different construction of the computer system of FIG. 1.

Furthermore, the situation in which the expansion unit 2 is connected to the expansion connector 26 of the portable computer main unit 1 and option cards 32 or 33 are connected to the expansion unit 2 is explained here, but as shown in FIG. 12, it is possible, where multiple expansion connectors 28 and 29 are located inside the portable computer main unit 1, to connect option cards 32 and 33 to the portable computer main unit 1 without using an expansion unit. In this case, photosensors 30 and 31 are located near the portable computer main unit 1's expansion connectors 28 and 29, as shown in the drawing.

In addition, it is possible to change not only I/O address areas and interrupt levels, but also DMA channels and memory addresses for I/O devices 24 and 25 in the same way.

Furthermore, although a hardware resource overlap only with option cards is considered here, a hardware resource overlap with various types of IC cards detachably connected to the portable computer main unit 1 may also be avoided in the same manner as for option cards.

Moreover, although a hardware resource overlap only with devices connected to the system bus 15 is explained here, there is no particular relationship to the type of bus. Therefore, in a computer constructed such that option devices may be connected to the CPU local bus 14, it is desirable for the internal devices connected to the CPU local bus 14 to be constructed such that the hardware resources allocated to such devices can be changed using software.

As described above, with this invention, because hardware resources such as I/O address areas allocated to internal I/O devices may be changed, even where the user, due to errors in setting jumpers, etc., sets the I/O address area for an option card to a value that overlaps with an I/O address area for an internal I/O device, the proper operation of the system as a whole, including the option card, may be secured.

It is claimed:

1. A computer system comprising:
   (a) a CPU;
   (b) a system bus electrically connected to the CPU;
   (c) an internal I/O device connected to the system bus and constructed such that the I/O address area assigned to the device may be changed;
   (d) an expansion connector electrically connected to the system bus;
   (e) an expansion device detachably connected to the expansion connector that receives and decodes the I/O address on the system bus via the expansion connector and operates when the I/O address falls within a prescribed I/O address area requested by the expansion device; and
   (f) an environment configuration means for configuring the operating environment for said internal I/O device when power to the system is turned on, wherein said environment configuration means comprises:
   (1) first means for outputting to said system bus the I/O address falling within a first I/O address area allocated beforehand to the internal I/O device and performing access of the internal I/O device via the system bus;
   (2) second means for determining, based on whether or not the access of the internal I/O device was performed normally, whether or not the first I/O address area allocated to the internal I/O device and the I/O address area requested by the expansion device overlap independent of recognizing the I/O address of the expansion device; and
   (3) third means for changing the I/O address area of the internal I/O device from the first I/O address area to a second I/O address area different from the first I/O address area when the I/O address areas are determined to overlap.

2. A computer system claimed in claim 1, wherein the first means includes a means that reads status data from a status register inside the internal I/O device designated by the I/O address falling within the first I/O address area.

3. A computer system claimed in claim 1, wherein the first means contains a means to perform write access to write the prescribed write data in the data register inside the internal I/O device designated by the I/O address falling within the first I/O address area, as well as a means to perform read access to read out the contents of the data register designated by the I/O address, and wherein the second means contains a means that compares the write data and the data read out by the read access and a means that determines, in accordance whether or not the write data and the read out data are the same, whether or not the first I/O address area allocated to the internal I/O device and the I/O address area requested by the expansion device overlap.

4. A computer system claimed in claim 1, comprising a means that sets a flag in a non-volatile memory device to indicate that environment configuration of the internal I/O device by the environment configuration means is underway; a means that resets the flag in response to the completion of environment configuration of the internal I/O device by the environment configuration means; and a means that determines whether or not the flag is set by reference to the non-volatile memory system when the system is turned on and changes the I/O address area allocated to the internal I/O device from the first I/O address area to the second I/O address area when the flag is set.

5. A computer system claimed in claim 1, further comprising a means that changes the interrupt level allocated to the internal I/O device when it is determined that the I/O address areas overlap.

6. A computer system comprising:
(a) a CPU;
(b) a system bus electrically connected to said CPU;
(c) an internal I/O device that is connected to said system bus and is set to 'enable' status when an 'enable' signal is received;
(d) an expansion connector electrically connected to said system bus;
(e) an expansion device detachably connected to said expansion connector that receives and decodes the I/O address on the system bus via the expansion connector and operates when the I/O address falls within a prescribed I/O address area requested by the expansion device;
(f) a first register where the value indicating the I/O address area allocated to said internal I/O device is set;
(g) means for decoding the I/O address from said CPU and generates said 'enable' signal when the I/O address from the CPU falls within the address area designated by the value set in said first register;
(h) an environment configuration means for configuring the operating environment for said internal I/O device when power to the system is turned on, wherein said environment configuration means comprises:
  (1) first means for setting a value indicating a first address area in said first register and allocating a first address area to the internal I/O device;
  (2) second means for outputting the I/O address failing within the first I/O address area to said system bus and performing access of the internal I/O device via the system bus;
  (3) third means for determining, based on whether or not the access of the internal I/O device was performed normally, whether or not the I/O address area allocated to the internal I/O device and the I/O address area requested by the expansion device overlap independent of recognizing the I/O address of the expansion device; and
  (4) fourth means for changing the value in the first register from the value indicating the first I/O address area to a value indicating a second I/O address area different from the first I/O address area when the I/O address areas are determined to overlap.

7. A computer system claimed in claim 6, further comprising:
(a) an interrupt controller having multiple interrupt input terminals for each of multiple interrupt levels that provides to said CPU an interrupt signal having an interrupt level corresponding to the interrupt input terminal to which the interrupt request signal is provided;
(b) a second register where a value designating the interrupt level of said internal I/O device is set;
(c) a means that is connected to two or more interrupt input terminals of said interrupt controller and provides an interrupt request signal to an interrupt input terminal of the interrupt controller corresponding to the interrupt level set in said second register when the interrupt request signal is received from the internal I/O device; and
(d) a means that renews the value set in the second register so that the interrupt level of the internal I/O device is changed when it is determined that an I/O address area overlap exists.

8. A computer system comprising:
(a) a CPU;
(b) a system bus electrically connected to said CPU;
(c) multiple internal I/O devices connected to said system bus and constructed such that their respective assigned I/O address areas may be changed;
(d) an expansion connector electrically connected to said system bus;
(e) an expansion device detachably connected to said expansion connector that receives and decodes the I/O address received from the system bus via said expansion connector and operates when the I/O address falls within the designated I/O address area requested by said expansion device;
(f) an address management table that houses address information indicating an address area provided beforehand for each internal I/O device such that the I/O address areas allocated to each of said multiple internal I/O devices differ from one another;
(g) an environment configuration means for determining whether or not the I/O address area for each of said internal I/O devices overlaps with the I/O address areas requested by said expansion devices, and configuring the operating environment for said multiple internal I/O devices in accordance with such determination, wherein said environment configuration means comprises:
  (1) first means for setting a flag in a non-volatile memory device indicating that environment configuration for one or more of said multiple internal I/O devices is underway;
  (2) second means for selecting each of said internal I/O devices in sequence for environment configuration and setting in said non-volatile memory device the device ID indicating the internal I/O device selected for environment configuration;
  (3) third means for outputting to said system bus the I/O address falling within the I/O address area for the internal I/O device designated for environment configuration by said address information and performing access of the internal I/O device designated for environment configuration by means of the system bus;
  (4) fourth means for determining, based on whether or not access of said internal I/O device designated for environment configuration was performed normally, whether or not said I/O address area assigned to said internal I/O device overlaps with the I/O address area requested by said expansion device independent of recognizing the I/O address of the expansion device;

(5) fifth means for, if it is determined that such an overlap exists, changing the address area for the internal I/O device designated for environment configuration by renewing said address information;

(6) sixth means for resetting said flag in response to the completion of the determination of the existence or non-existence of an overlapping I/O address area for each of said multiple internal I/O devices;

(7) seventh means for determining whether or not said flag is set by reference to said non-volatile memory device when the system power is turned on;

(8) eighth means for, in response to a determination that said flag is set, renewing said address information for the internal I/O device designated by the device ID stored in said non-volatile memory device and changing the I/O address area assigned to the internal I/O device designated by said device ID; and (9) ninth means for, in response to a determination that said flag is reset, having said environment configuration means carry out the environment configuration operation.

9. A computer system comprising:

a CPU;

a system bus electrically connected to the CPU;

an internal I/O device connected to the system bus and constructed such that the I/O address area assigned to the device may be changed;

an expansion connector electrically connected to the system bus;

an expansion device detachably connected to the expansion connector that receives and decodes the I/O address on the system bus via the expansion connector and operates when the I/O address falls within a prescribed I/O address area requested by the expansion device; and an environment configuration means for configuring the operating environment for the internal I/O device when power to the system is turned on, wherein the environment configuration means comprises:

first means for outputting to the system bus the I/O address falling within a prescribed first I/O address area allocated to the internal I/O device and performing access of the internal I/O device via the system bus;

second means for determining whether or not the first I/O address area allocated to the internal I/O device and the I/O address area requested by the expansion device overlap by writing data to a data register of the internal I/O device, reading data from the data register of the internal I/O device and comparing the data read from the data register and the data written to the data register independent of recognizing the I/O address of the expansion device;

third means for changing the I/O address area of the internal I/O device from the first I/O address area to a prescribed second I/O address area different from the first I/O address area when the I/O address areas are determined to overlap; and fourth means for disabling the internal I/O device if the prescribed second I/O address area given to the internal I/O device overlaps with the I/O address area requested by the expansion device.

10. A computer system claimed in claim 9, wherein the first means includes a means that reads status data from a status register inside the internal I/O device designated by the I/O address falling within the first I/O address area.

11. A computer system claimed in claim 10, further comprising flag setting means that sets a flag in a non-volatile memory device to indicate that environment configuration operation of the internal I/O device by the environment configuration means is underway;

flag resetting means that resets the flag in response to the completion of the environment configuration operation of the internal I/O device by the environment configuration means; and flag determining means that determines whether or not the flag is set by reference to the non-volatile memory system when the system is turned on and changes the I/O address area allocated to the internal I/O device from the first I/O address area to the second I/O address area when the flag is set.

12. A computer system claimed in claim 11, further comprising a means that changes the interrupt level allocated to the internal I/O device when it is determined that the I/O address areas overlap.

13. A method of determining whether or not an I/O address area for an internal I/O device overlaps with an I/O address area requested by an expansion device, and configuring an operating environment for the internal I/O device in accordance with such determination by:

setting a flag in a non-volatile memory device indicating that environment configuration for the internal I/O devices is underway;

setting in the non-volatile memory device a device ID indicating the internal I/O device selected for environment configuration;

outputting to a system bus an I/O address falling within the I/O address area for the internal I/O device;

performing access of the internal I/O device by means of the system bus;

writing data to a data register of the internal I/O device;

reading data from the data register of the internal I/O device;

comparing the data read from the data register and the data written to the data register to determine if the overlap between the I/O address area for the internal I/O device and the I/O address area requested by the expansion device exists independent of recognizing the I/O address of the expansion device;

changing the address area for the internal I/O device by renewing address information contained in an address management table for the internal I/O device if it is determined that the overlap exists;

resetting the flag in response to the completion of the determination of the existence or non-existence of an overlapping I/O address area for the internal I/O devices;

determining whether or not the flag is set by reference to the non-volatile memory device when system power is turned on;

renewing said address information for the internal I/O device designated by the device ID stored in the non-volatile memory device in response to a determination that said flag is set;

changing the I/O address area assigned to the internal I/O device designated by the device ID; and carrying out the environment configuration operation in response to a determination that said flag is reset.

14. A computer system comprising:

a CPU;

a system bus electrically connected to the CPU;

an internal I/O device connected to the system bus and constructed such that the I/O address area assigned to the device may be changed;

an expansion connector electrically connected to the system bus;

an expansion device detachably connected to the expansion connector that receives and decodes the I/O address on the system bus via the expansion connector and operates when the I/O address falls within a prescribed I/O address area requested by the expansion device;

an I/O address change circuit for changing the I/O address area of the internal I/O device from a prescribed first I/O address area to a prescribed second I/O address area different from the first I/O address area when the I/O address areas are determined to overlap;

a system BIOS for configuring an operating environment for the internal I/O device when power to the system is turned on by:

outputting to the system bus the I/O address falling within the prescribed first I/O address area allocated to the internal I/O device and performing access of the internal I/O device via the system bus, determining whether or not the first I/O address area allocated to the internal I/O device and the I/O address area requested by the expansion device overlap by writing data to a data register of the internal I/O device, reading data from the data register of the internal I/O device and comparing the data read from the data register and the data written to the data register independent of recognizing the I/O address of the expansion device, and disabling the internal I/O device if the prescribed second I/O address area given to the internal I/O device overlaps with the I/O address area requested by the expansion device.

15. A computer system claimed in claim 14, wherein the system BIOS further configures the operating environment by:

setting a flag in a non-volatile memory device to indicate that environment configuration operation of the internal I/O device by the system BIOS is underway and resetting the flag in response to the completion of environment configuration operation of the internal I/O device by the system BIOS; and determining whether or not the flag is set by reference to the non-volatile memory system when the system is turned on, and changing the I/O address area allocated to the internal I/O device from the first I/O address area to the second I/O address area when the flag is set.

16. A computer system claimed in claim 15, further comprising an interrupt level changing circuit that changes the interrupt level allocated to the internal I/O device when it is determined that the I/O address areas overlap.

17. A computer system claimed in claim 1, wherein the environment configuration means further includes fourth means for disabling the internal I/O device if the second I/O address area given to the internal I/O device overlaps with the I/O address area requested by the expansion device.

18. A computer system claimed in claim 6, wherein the environment configuration means further includes fifth means for disabling the internal I/O device if the second I/O address area given to the internal I/O device overlaps with the I/O address area requested by the expansion device.

19. A computer system claimed in claim 1, wherein the second I/O address area is a prescribed I/O address area.

20. A computer system claimed in claim 6, wherein the second I/O address area is a prescribed I/O address area.

21. A computer system claimed in claim 1, wherein the internal I/O device and the expansion device are not ACR adapters.

22. A computer system claimed in claim 6, wherein the internal I/O device and the expansion device are not ACR adapters.

* * * * *